United States Patent
Durbin et al.

(10) Patent No.: US 11,463,406 B2
(45) Date of Patent: Oct. 4, 2022

(54) SYSTEM AND METHOD FOR DETECTING POTENTIALLY HARMFUL DATA

(71) Applicant: ZixCorp Systems, Inc., Dallas, TX (US)

(72) Inventors: Jonathan Daniel Durbin, Milan, MI (US); Christopher Dylan Bruch Foster, Ann Arbor, MI (US)

(73) Assignee: ZIXCORP SYSTEMS, INC., Dallas, TX (US)

( * ) Notice: Subject to any disclaimer, the term of this patent is extended or adjusted under 35 U.S.C. 154(b) by 736 days.

(21) Appl. No.: 15/982,747

(22) Filed: May 17, 2018

(65) Prior Publication Data
US 2019/0356633 A1    Nov. 21, 2019

(51) Int. Cl.
| | | |
|---|---|---|
| H04L 29/06 | (2006.01) | |
| H04L 12/58 | (2006.01) | |
| H04L 9/40 | (2022.01) | |
| G06F 16/23 | (2019.01) | |
| G06F 16/955 | (2019.01) | |
| G06F 16/9535 | (2019.01) | |
| H04L 51/42 | (2022.01) | |

(52) U.S. Cl.
CPC ...... *H04L 63/0245* (2013.01); *G06F 16/2379* (2019.01); *G06F 16/955* (2019.01); *G06F 16/9535* (2019.01); *H04L 51/42* (2022.05); *H04L 63/0421* (2013.01)

(58) Field of Classification Search
CPC . H04L 63/0245; H04L 51/22; H04L 63/0421; G06F 16/2379; G06F 16/955; G06F 16/9535
See application file for complete search history.

(56) References Cited

U.S. PATENT DOCUMENTS

| | | |
|---|---|---|
| 2005/0060643 A1 | 3/2005 | Glass et al. |
| 2006/0036693 A1 | 2/2006 | Hulten et al. |

(Continued)

FOREIGN PATENT DOCUMENTS

EP    1613010 A2    1/2006

OTHER PUBLICATIONS

Extended European Search Report for corresponding European Application No. 19170202.6 dated Sep. 20, 2019.

(Continued)

*Primary Examiner* — Noura Zoubair
(74) *Attorney, Agent, or Firm* — Sprinkle IP Law Group

(57) ABSTRACT

A method includes receiving electronic data, extracting a first identifier from the electronic data, extracting first attributes from the electronic data, and searching a database for identifiers that match the first identifier to determine a number of matching identifiers. The method also includes determining that the number of matching identifiers exceeds a first threshold and searching the database for attributes associated with each of the matching identifiers to determine a subset of matching attributes. The method further includes calculating a specificity for the subset of matching attributes, determining that the specificity of the subset of matching attributes is less than or equal to a second threshold, and creating a filter based at least in part on the determination that the specificity of the subset of matching attributes is less than or equal to the second threshold.

20 Claims, 4 Drawing Sheets

(56) References Cited

U.S. PATENT DOCUMENTS

2012/0030293 A1\* 2/2012 Bobotek ............... G06Q 10/10
709/206
2015/0096024 A1  4/2015 Haq et al.
2018/0091453 A1\* 3/2018 Jakobsson ............... H04L 51/12

OTHER PUBLICATIONS

Anderson, S. D., "Combining Evidence using Bayes' Rule," dated Feb. 26, 2004, 4 pages.
Anderson, S. D., "Combining Evidence using Bayes' Rule," dated Feb. 26, 2007, 4 pages.
European Patent Office, Office Action issued in European Patent Application No. EP 19170202.6, dated Apr. 19, 2021.

\* cited by examiner

SYSTEM AND METHOD FOR DETECTING POTENTIALLY HARMFUL DATA

TECHNICAL FIELD

Certain embodiments of this disclosure relate generally to systems and methods for detecting potentially harmful data, and more specifically, for creating filters to automatically detect and filter potentially harmful electronic data.

BACKGROUND

Networks allow users to share information, such as electronic data, with each other. This shared information may be harmful to the recipient. For example, a recipient may receive unsolicited information. As another example, the recipient may receive information that contains dangerous content. For instance, a recipient of information over a network may be susceptible to attacks by unauthorized users trying to gain access to sensitive information being communicated across the network. Unauthorized access to a network may compromise the security of the data and information being communicated by the network.

SUMMARY OF THE DISCLOSURE

According to one embodiment, a filtering system includes an interface, one or more extraction generators, one or more specificity generators, and a filter generator. The interface receives electronic data. The one or more extraction generators extract a first identifier from the electronic data and extract first attributes from the electronic data. The one or more specificity generators search a database for identifiers that match the first identifier to determine a number of matching identifiers. The one or more specificity generators may determine that the number of matching identifiers exceeds a first threshold. The one or more specificity generators also search the database for attributes associated with each of the matching identifiers to determine a subset of matching attributes. The first attributes and the attributes associated with each of the matching identifiers each comprise the subset of matching attributes. The one or more specificity generators further calculate a specificity for the subset of matching attributes. The filter generator determines that the specificity of the subset of matching attributes is less than or equal to a second threshold and creates a filter based at least in part on the determination that the specificity of the subset of matching attributes is less than or equal to the second threshold.

In particular embodiments, the electronic data is an email message. The first identifier may be associated with one of the following: an HTML pattern, a link, a domain, and a phone number. The first attributes may include one of the following: a number of links in the email message, a country where the email message originated, and a number of attachments attached to the email message.

In particular embodiments, the system further includes a threat detector that applies the filter to the electronic data, detects a threat in the electronic data based at least in part on the applied filter, rejects delivery of the electronic data to the electronic data's specified destination based at least in part on the applied filter, and automatically updates the database to include the filter, wherein the filter is associated with the first identifier and the subset of matching attributes.

In particular embodiments, the system further includes one or more normalization generators and one or more anonymization generators. The one or more normalization generators normalize the first identifier and normalize each of the first attributes. The one or more anonymization generators anonymize the first identifier and anonymize each of the first attributes. The one or more specificity generators may further calculate a specificity for the first attributes and calculate a specificity for the first identifier.

In particular embodiments, the system further includes a probability generator that calculates a threat probability for the first attributes. Creating the filter may be based on the threat probability.

In particular embodiments, calculating the specificity for the subset of matching attributes is based at least in part on the following: a number of total electronic data associated with an accepted count of each matching attribute and a number of the total electronic data associated with a rejected count of each matching attribute.

In particular embodiments, the interface receives a plurality of electronic data. The first threshold is a predetermined number of matching identifiers received within a predetermined time period and the second threshold is an average attribute specificity calculated by averaging the attribute specificities associated with each of the plurality of electronic data. Each attribute specificity is calculated using all of the attributes associated with the corresponding electronic data.

According to another embodiment, a method includes receiving electronic data, extracting a first identifier from the electronic data, extracting first attributes from the electronic data, and searching a database for identifiers that match the first identifier to determine a number of matching identifiers. The method also includes determining that the number of matching identifiers exceeds a first threshold and searching the database for attributes associated with each of the matching identifiers to determine a subset of matching attributes. The first attributes and the attributes associated with each of the matching identifiers may each include the subset of matching attributes. The method further includes calculating a specificity for the subset of matching attributes, determining that the specificity of the subset of matching attributes is less than or equal to a second threshold, and creating a filter based at least in part on the determination that the specificity of the subset of matching attributes is less than or equal to the second threshold.

In particular embodiments, the method further includes applying the filter to the electronic data, detecting a threat in the electronic data based at least in part on the applied filter, rejecting delivery of the electronic data to the electronic data's specified destination based at least in part on the applied filter, and automatically updating the database to include the filter, wherein the filter is associated with the first identifier and the subset of matching attributes.

In particular embodiments, the method further includes normalizing the first identifier, anonymizing the first identifier, calculating a specificity for the first identifier, normalizing each of the first attributes, anonymizing each of the first attributes, and calculating a specificity for the first attributes.

In particular embodiments, the method further includes calculating a threat probability for the first attributes. Creating the filter may be based on the threat probability.

In particular embodiments, the method further includes receiving a plurality of electronic data. The first threshold may be a predetermined number of matching identifiers received within a predetermined time period and the second threshold may be an average attribute specificity calculated by averaging the attribute specificities associated with each of the plurality of electronic data. Each attribute specificity may be calculated using all of the attributes associated with the corresponding electronic data.

According to yet another embodiment, a non-transitory computer readable medium includes instructions for causing processing circuitry to receive electronic data, extract a first identifier from the electronic data, and extract first attributes from the electronic data. The instructions also cause the processing circuitry to search a database for identifiers that match the first identifier to determine a number of matching identifiers, determine that the number of matching identifiers exceeds a first threshold, and search the database for attributes associated with each of the matching identifiers to determine a subset of matching attributes. The first attributes and the attributes associated with each of the matching identifiers may each include the subset of matching attributes. The instructions further cause the processing circuitry to calculate a specificity for the subset of matching attributes, determine that the specificity of the subset of matching attributes is less than or equal to a second threshold, and create a filter based at least in part on the determination that the specificity of the subset of matching attributes is less than or equal to the second threshold.

In particular embodiments, the instructions further cause the processing circuitry to dynamically update a list of the identifiers in the database based on one or more pre-determined criteria and dynamically update a list of the attributes in the database based on one or more pre-determined criteria.

In particular embodiments, the instructions further cause the processing circuitry to apply the filter to the electronic data, detect a threat in the electronic data based at least in part on the applied filter, reject delivery of the electronic data to the electronic data's specified destination based at least in part on the applied filter, and automatically update the database to include the filter, wherein the filter is associated with the first identifier and the subset of matching attributes.

In particular embodiments, the instructions further cause the processing circuitry to normalize the first identifier, anonymize the first identifier, calculate a specificity for the first identifier, normalize each of the first attributes, anonymize each of the first attributes, and calculate a specificity for the first attributes.

In particular embodiments, the instructions further cause the processing circuitry to calculate a threat probability for the first attributes. Creating the filter may be based on the threat probability.

In particular embodiments, calculating the specificity for the subset of matching attributes is based at least in part on the following: a number of total electronic data associated with an accepted count of each matching attribute and a number of the total electronic data associated with a rejected count of each matching attribute.

Certain embodiments may provide one or more technical advantages. For example, certain embodiments detect threats (e.g., spam, viruses) embedded inside electronic data (e.g., email messages). As another example, certain embodiments detect threats (e.g., a new form of malware attachment or a link to a fake site) that originate from the same source with the same goal (e.g., a campaign). As another example, certain embodiments may detect identifiers associated with electronic data (e.g., email messages) that correspond to one and only one campaign. As still another example, certain embodiments may create a filter with matching attributes of messages containing a campaign identifier. As another example, certain embodiments may apply the created filter of matching attributes to electronic data to detect and block harmful data within the electronic data from reaching its specified destination.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Figure 1:
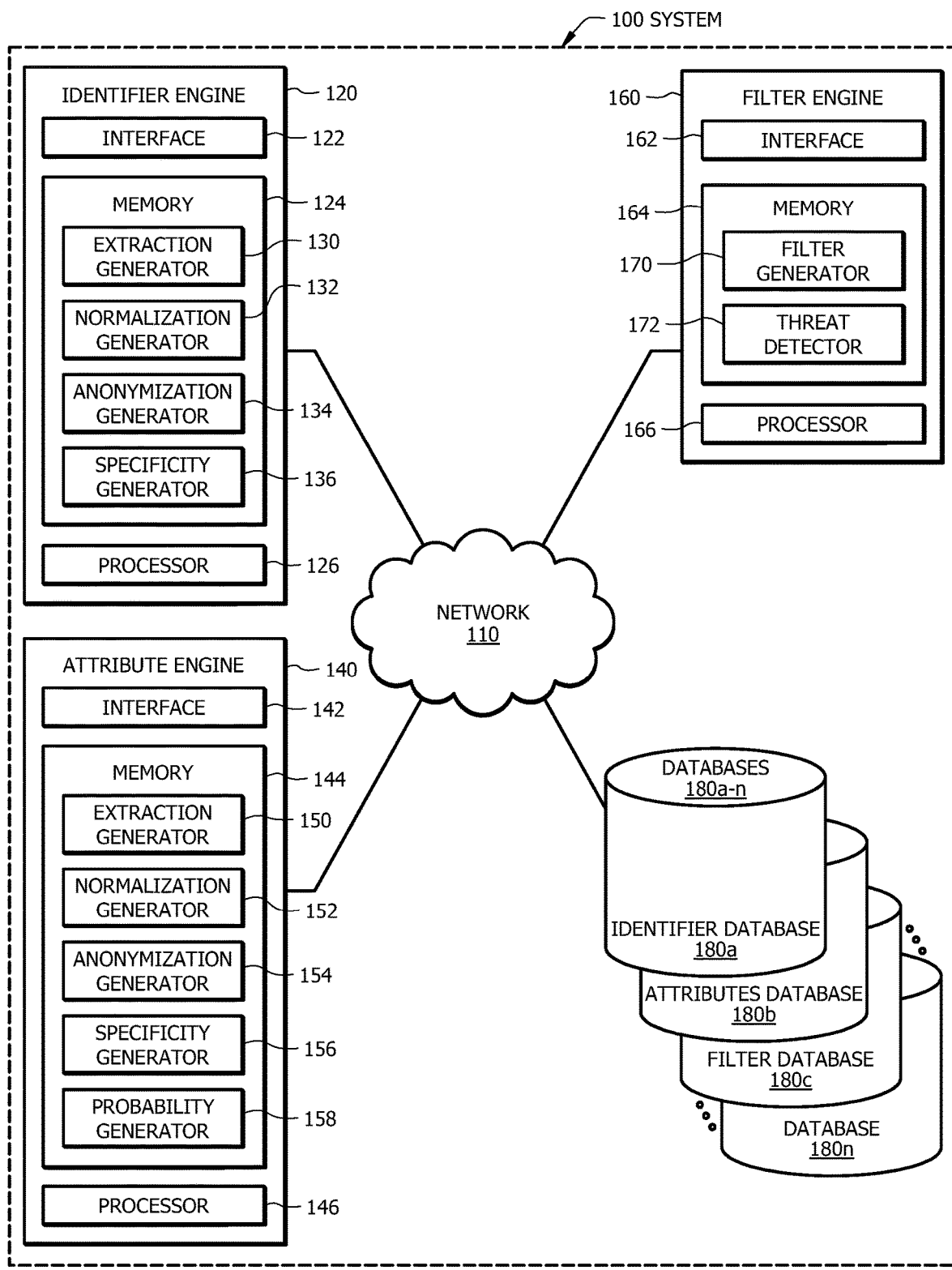
FIG. 1 illustrates an example system for filtering electronic data, according to certain embodiments.

FIG. 1 illustrates an example system 100 for filtering electronic data, according to certain embodiments. System 100 includes a network 110, an identifier engine 120, an attribute engine 140, a filter engine 160, and databases 180*a-n*, where n represents any suitable integer.

System 100 or portions thereof may be associated with an entity, which may include any entity, such as a person, business, or company, that filters electronic data. Throughout this description, this entity is referred to as the entity associated with system 100. In one embodiment, network 110, identifier engine 120, attribute engine 140, filter engine 160, and databases 180*a-n* may be included within an entity and connected by network 110. The elements of system 100 may be implemented using any suitable combination of hardware, firmware, and software.

Although FIG. 1 illustrates a particular arrangement of network 110, identifier engine 120, attribute engine 140, filter engine 160, and databases 180*a-n*, this disclosure contemplates any suitable arrangement of network 110, identifier engine 120, attribute engine 140, filter engine 160, and databases 180*a-n*. As an example and not by way of limitation, two or more of network 110, identifier engine 120, attribute engine 140, and filter engine 160 and one or more of databases 180*a-n* may be connected to each other directly, bypassing network 110. As another example, two or more of network 110, identifier engine 120, attribute engine 140, and filter engine 160 and one or more of databases 180*a-n* may be physically or logically co-located with each other in whole or in part. Moreover, although FIG. 1 illustrates a particular number of networks 110, identifier engines 120, attribute engines 140, filter engines 160, and databases 180*a-n*, this disclosure contemplates any suitable number of networks 110, identifier engines 120, attribute engines 140, filter engines 160, and databases 180a-n.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110. Network 110 may be any communications network, such as a private network, a public network, a connection through the internet, a mobile network, a WI-FI network, etc. One or more components of system 100 may communicate over network 100. For example, filter engine 160 may communicate over network 110, including receiving data from identifier engine 120, attribute engine 140, and/or databases 180a-n. As another example, identifier database 180a may receive one or more identifiers from identifier engine 120. As still another example, attributes database 180b may receive one or more attributes from attribute engine 140.

In some embodiments, identifier engine 120 is a computer program for analyzing electronic data to identify characteristics (e.g., one or more identifiers) of the data. In the illustrated embodiment, identifier engine 120 includes an interface 122, a memory 124, and a processor 126. Memory 124 of identifier engine 120 includes extraction generator 130, normalization generator 132, anonymization generator 134, and specificity generator 136. The elements of identifier engine 120 may be implemented using any suitable combination of hardware, firmware, and software.

Identifier engine 120 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Identifier engine 120 may be a stand-alone computer or may be a part of a larger network of computers associated with an entity.

Interface 122 of identifier engine 120 represents any suitable computer element that can receive information from network 110, transmit information through network 110, perform suitable processing of the information, communicate to other components (e.g., identifier database 180a) of system 100, or any combination of the preceding. For example, interface 122 may receive electronic data (e.g., an email message) from a server (e.g., a client server) external to the enterprise associated with system 100 via network 110. As another example, interface 122 may receive electronic data from one or more databases 180a-n (e.g., a database that stores incoming email messages). As still another example, interface 122 may transmit electronic data to one or more computer programs stored in memory 124 of identifier engine 120. Interface 122 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 124 of identifier engine 120 stores, permanently and/or temporarily, received and transmitted information, as well as system software, control software, other software for identifier engine 120, and a variety of other information. Memory 124 may store information for execution by processor 126. In the illustrated embodiment, memory 124 stores extraction generator 130, normalization generator 132, anonymization generator 134, and specificity generator 136 of identifier engine 120. In some embodiments, identifier engine 120 may store one or more databases 180a-n (e.g., a database that stores incoming email messages and/or identifier database 180a).

Memory 124 includes any one or a combination of volatile or non-volatile local or remote devices suitable for storing information. For example, memory 124 may include Random Access Memory ("RAM"), Read-only Memory ("ROM"), magnetic storage devices, optical storage devices, or any other suitable information storage device or a combination of these devices. Memory 124 may include any suitable information for use in the operation of identifier engine 120. Additionally, memory 124 may be a component external to (or may be partially external to) identifier engine 120. Memory 124 may be located at any location suitable for memory 124 to communicate with identifier engine 120.

Processor 126 of identifier engine 120 controls certain operations of identifier engine 120 by processing information received from interface 122 and memory 124 or otherwise accessed by processor 126. Processor 126 communicatively couples to interface 122 and memory 124. Processor 126 includes any hardware and/or software that operates to control and process information. Processor 126 may be a programmable logic device, a microcontroller, a microprocessor, any suitable processing device, or any suitable combination of the preceding. Additionally, processor 126 may be a component external to identifier engine 120. Processor 126 may be located in any location suitable for processor 126 to communicate with identifier engine 120. Processor 126 controls the operation of extraction generator 130, normalization generator 132, anonymization generator 134, and specificity generator 136.

In the illustrated embodiment, extraction generator 130 of identifier engine 120 accesses electronic data, processes and analyzes the accessed data, and arranges this data for input into one or more components of system 100. For example, extraction generator 130 may receive electronic data from interface 122, extract one or more identifiers from the electronic data, and arrange the one or more identifiers for input into identifier database 180a. An identifier is any identifier used to identify similarities between electronic data. As an example, the same identifier may be extracted from multiple email messages, indicating potential similarities between the multiple email messages. Extraction generator 130 may search the electronic data for a list of pre-determined identifiers. The list of pre-determined identifiers may change over time. For example, the list of pre-determined identifiers may be dynamically updated based on one or more pre-determined criteria (e.g., a new action item based on a new communication protocol.) In certain embodiments, the one or more identifiers may be associated with one or more of the following: an HTML pattern, a link, a portion of a link (e.g., a domain, a subdomain, or a directory contained within a link), an action item (e.g., a phone number or email address referenced within the message), an attachment, a sending IP address, and an envelope sender.

The one or more identifiers may identify a campaign (e.g., an email campaign). For example, an identifier (e.g., an attachment or a link) may originate from the same source with the same goal (e.g., a new form of malware attachment or a link to a fake medications website). In certain embodiments, the identifier may accurately identify a campaign. In some embodiments, the identifier may not correspond to a single campaign. Interface 122 may transmit the one or more identifiers to normalization generator 132.

Normalization generator 132 of identifier engine 120 normalizes electronic data received from one or more components of system 100. In the illustrated embodiment, normalization generator 132 receives the extracted identifiers from extraction generator 130 and normalizes the identifiers that are logically equivalent. For example, extraction generator may receive email addresses john@doe.com and John@Doe.com and normalize these two email addresses so that they are recognized as being equivalent. Interface 122 may transmit the normalized identifiers to anonymization generator 134.

In the illustrated embodiment, anonymization generator 134 of identifier engine 120 anonymizes data received from one or more components of system 100. For example, anonymization generator 132 may receive the one or more identifiers from extraction generator 130 and anonymize the one or more identifiers. As another example, anonymization generator 132 may receive the one or more normalized identifiers from normalization generator 132 and anonymize the one or more normalized identifiers. The identifiers may be anonymized to secure the data. For example, an identifier may contain client information, and the identifier may be anonymized to prevent leakage of the client information. In certain embodiments, the identifiers are anonymized through cryptographic hash functions. For example, a cryptographic hash function (e.g., SHA-256) may convert each identifier into a hash value (e.g., a unique 256-bit signature). Interface 122 may transmit the anonymized identifiers to specificity generator 136.

In certain embodiments, specificity generator 136 of identifier engine 120 determines whether the extracted identifiers identify a campaign and, based on that determination, calculates a specificity. For example, specificity generator 136 may search identifier database 180a for identifiers that match the one or more extracted identifiers to determine a number of matching identifiers. If the number of matching identifiers is greater than a first predetermined threshold, a specificity for the matching attributes of the received electronic data is calculated. The specificity of the matching attributes may be calculated using the specificity equation provided and described below in the description of specificity generator 156 of attribute engine 140.

In the illustrated embodiment, attribute engine 140 is a computer program for analyzing electronic data to identify characteristics (e.g., one or more attributes) of the data. In the illustrated embodiment, attribute engine 140 includes an interface 142, a memory 144, and a processor 146. Memory 144 of attribute engine 140 includes extraction generator 150, normalization generator 152, anonymization generator 154, and specificity generator 156. The elements of attribute engine 140 may be implemented using any suitable combination of hardware, firmware, and software.

Attribute engine 140 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Attribute engine 140 may be a stand-alone computer or may be a part of a larger network of computers associated with an entity.

Interface 142 of attribute engine 140 represents any suitable computer element that can receive information from network 110, transmit information through network 110, perform suitable processing of the information, communicate to other components (e.g., attributes database 180b) of system 100, or any combination of the preceding. For example, interface 142 may receive electronic data (e.g., an email message) from a server (e.g., a client server) external to the enterprise associated with system 100 via network 110. As another example, interface 142 may receive electronic data from one or more databases 180a-n (e.g., a database that stores incoming email messages). As still another example, interface 142 may transmit electronic data to one or more computer programs stored in memory 144 of attribute engine 140. Interface 142 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 144 of attribute engine 140 stores, permanently and/or temporarily, received and transmitted information, as well as system software, control software, other software for attribute engine 140, and a variety of other information.

Memory 144 may store information for execution by processor 146. In the illustrated embodiment, memory 144 stores extraction generator 150, normalization generator 152, anonymization generator 154, and specificity generator 156 of attribute engine 140. In some embodiments, attribute engine 140 may store one or more databases 180a-n (e.g., a database that stores incoming email messages and/or attributes database 180b).

Memory 144 includes any one or a combination of volatile or non-volatile local or remote devices suitable for storing information. For example, memory 144 may include Random Access Memory ("RAM"), Read-only Memory ("ROM"), magnetic storage devices, optical storage devices, or any other suitable information storage device or a combination of these devices. Memory 144 may include any suitable information for use in the operation of attribute engine 140. Additionally, memory 144 may be a component external to (or may be partially external to) attribute engine 140. Memory 144 may be located at any location suitable for memory 144 to communicate with attribute engine 140.

Processor 146 of attribute engine 140 controls certain operations of attribute engine 140 by processing information received from interface 142 and memory 144 or otherwise accessed by processor 146. Processor 146 communicatively couples to interface 142 and memory 144. Processor 146 includes any hardware and/or software that operates to control and process information.

Processor 146 may be a programmable logic device, a microcontroller, a microprocessor, any suitable processing device, or any suitable combination of the preceding. Additionally, processor 146 may be a component external to attribute engine 140. Processor 146 may be located in any location suitable for processor 146 to communicate with attribute engine 140. Processor 146 controls the operation of extraction generator 150, normalization generator 152, anonymization generator 154, specificity generator 156, and probability generator 158.

In the illustrated embodiment, extraction generator 150 of attribute engine 140 accesses electronic data, processes and analyzes the accessed data, and arranges this data for input into one or more components of system 100. For example, extraction generator 150 may receive electronic data from interface 152, extract one or more attributes from the electronic data, and arrange the one or more attributes for input into attributes database 180b. An attribute is any characteristic or property of electronic data. For example, an attribute may be a country where an email message originated or whether the electronic data passed or failed the Sender Policy Framework ("SPF").

In certain embodiments, extraction generator 150 generates a value associated with each electronic data (e.g., an email message). For example, extraction generator 150 may determine that an email message contains 3 Hypertext Transfer Protocol ("HTTP") links and generate a value of 3 for that particular message. In some embodiments, an attribute is a key/value pair. A key/value pair is a set of two linked data items. A key/value pair may be one of the following: a number of links in an email message, a number of attachments in an email message, or a number of emails blocked from the sender's IP address. Extraction generator 150 may search the electronic data for a list of pre-determined attributes (e.g., key/value pairs). The list of pre-determined attributes may change over time. In certain embodiments, the pre-determined list of attributes may be dynamically updated based on one or more pre-determined criteria. For example, a regular expression to search for text content may be updated to include additional variations. The one or more attributes may identify a campaign (e.g., an email campaign). Interface 142 may transmit the one or more attributes to normalization generator 152.

Normalization generator 152 of attribute engine 140 normalizes electronic data received from one or more components of system 100. In the illustrated embodiment, normalization generator 152 receives the extracted attributes from extraction generator 130 and normalizes the attributes that are logically equivalent. Interface 142 may transmit the normalized attributes to anonymization generator 154.

In the illustrated embodiment, anonymization generator 154 of attribute engine 140 anonymizes data received from one or more components of system 100. For example, anonymization generator 154 may receive the one or more attributes from extraction generator 150 and anonymize the one or more attributes. As another example, anonymization generator 154 may receive the one or more normalized attributes from normalization generator 152 and anonymize the one or more normalized attributes. The attributes may be anonymized to secure the data. For example, an attribute may contain client information, and the attribute may be anonymized to prevent leakage of the client information. In certain embodiments, the normalized attributes are anonymized through cryptographic hash functions. For example, a cryptographic has function (e.g., SHA-256) may convert each attribute into a hash value (e.g., a unique 256-bit signature). Interface 122 may transmit the anonymized attributes to specificity generator 156.

In certain embodiments, specificity generator 156 of attribute engine 140 determines a specificity value for each electronic data (e.g., email message, document, or text message). The specificity value for each electronic data may be calculated using the attributes found in each respective electronic data. For example, extraction generator 150 may determine that a first email message includes the following first, second, and third attributes: Links/3, Domains/3, and HTTP Secure ("HTTPS") Links/4. Specificity generator 156 may calculate a specificity value for the first email message based on these three attributes. In certain embodiments, the specificity value is calculated using the following equation:

$$\text{Specificity} = P(\text{reject})\Pi_{i=0}^{N} P(\text{attribute/reject}) + P(\text{accept})\Pi_{i=0}^{N} P(\text{attribute/accept})$$

where:
P(reject)=(total rejected count/total messages)
P(accept)=(total accepted count/total messages)
P(attribute/reject)=(rejected attribute count/total rejected count)
P(attribute/accept)=(accepted attribute count/total accepted count)

In the example, the first email message with the first, second, and third attributes may be one of 115 email messages received by system 100. Thus, the total number of messages (i.e., "total messages") is 115. Extraction generator 150 may determine that the first attribute, Links/3, was rejected in 15 of the 115 messages and was accepted in 10 of the 115 messages. Thus, the rejected attribute count for the first attribute is 15 and the accepted attribute count for the first attribute is 10. Extraction generator 150 may determine that the second attribute, Domains/3, was rejected in 20 of the 115 messages and was accepted in 5 of the 115 messages. Thus, the rejected attribute count for the second attribute is 20 and the accepted attribute count for the second attribute is 5. Extraction generator 150 may determine that the third attribute, HTTPS Links/4, was rejected in 5 of the 115 messages but was accepted in 23 of the 115 messages. Thus, the rejected attribute count for the third attribute is 5 and the accepted attribute count for the third attribute is 23.

The 115 email messages may contain additional attributes that are not in the first email message. For example, extraction generator 150 may determine that a fourth attribute, Subject matter contains/"Free," was rejected in 30 of the 115 messages and was accepted in 2 of the 115 messages. Thus, the rejected attribute count for the fourth attribute is 30 and the accepted attribute count for the fourth attribute is 2. The total rejected count in this example is 15+20+5+30, which is 70, and the total accepted count is 10+5+23+2, which is 40. The first part of the equation, $P(\text{reject})\Pi_{i=0}^{N} P(\text{attribute/reject})$, is $(70/110)*(15/70)*(20/70)*(5/70)=0.00278$; the second part of the equation, $P(\text{accept})\Pi_{i=0}^{N} P(\text{attribute/accept})$, is $(40/110)*(10/70)*(5/70)*(23/70)=0.00122$; and the specificity value for the first email message is 0.004.

In certain embodiments, specificity generator 156 calculates an average specificity value for all electronic data. For example, system 100 may receive 2,000 email messages, and specificity generator 156 may calculate a specificity value for each of the 2,000 email messages. Specificity generator 156 may then calculate an average specificity value for the 2,000 calculated specificity values.

In certain embodiments, specificity generator 136 of identifier engine 120 calculates a matching attributes specificity value using the specificity equation above. For example, specificity generator 136 may determine which attributes are included in email messages associated with an identified campaign and calculate a specificity using the matching attributes from the email messages with matching identifiers. Specificity generator 136 may then determine whether the calculated matching attribute specificity value is less than or equal to a second predetermined threshold. In certain embodiments, the second predetermined threshold is the average of the specificity values calculated for all electronic data. If the matching attributes specificity value is less than or equal to the average single electronic data specificity value, interface 122 of identifier engine 120 may send the matching attributes to filter engine 160, which may create a filter that includes the matching attributes.

In some embodiments, probability generator 158 of attribute engine 140 determines a rejection probability value for each electronic data (e.g., email message, document, or text message). The rejection probability value represents a percentage chance that system 100 should reject the electronic data. For example, extraction generator 150 may determine that a first email message includes the following first, second, and third attributes: Links/3, Domains/3, and HTTP Secure ("HTTPS") Links/4. Specificity generator 156 may calculate a specificity value for the first email message based on these three attributes (e.g., 0.0076). In certain embodiments, the rejection probability value is calculated using the following equations:

$$n = P(\text{reject})\Pi_{i=0}^{N} P(\text{attribute/reject}) \text{rejection probability} = n/(n + (P(\text{accept})\Pi_{i=0}^{N} P(\text{attribute/accept}))$$

where:
P(reject)=(total rejected count/total messages)
P(accept)=(total accepted count/total messages)
P(attribute/reject)=(rejected attribute count/total rejected count)
P(attribute/accept)=(accepted attribute count/total accepted count)

In this example, the value of $n=P(\text{reject})\Pi_{i=0}^{N}P(\text{attribute/reject})$, is (70/110)*(15/70)*(20/70)*(5/70)=0.00278; the value of $P(\text{accept})\Pi_{i=0}^{N}P(\text{attribute/accept})$, is (40/110)*(10/70)*(5/70)*(23/70)=0.00122; and the rejection probability value for the first email message is 0.00278/(0.00278+0.00122)=0.00278/(0.004)=0.70, or 70 percent (70%).

In the illustrated embodiment, filter engine 160 of system 100 is a computer program for filtering electronic data. In certain embodiments, filter engine 160 creates filters, applies filters to electronic data, and determines whether to filter the electronic data (e.g., an email message) based at least in part on the applied filters. In some embodiments, filter engine 160 determines whether an email message presents a threat and, based on that determination, either rejects or delivers the email message to its intended recipient. In the illustrated embodiment, filter engine 160 includes an interface 162, a memory 164, and a processor 166. Memory 164 of filter engine 160 includes filter generator 170 and threat detector 172. The elements of filter engine 160 may be implemented using any suitable combination of hardware, firmware, and software.

Filter engine 160 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Filter engine 160 may be a stand-alone computer or may be a part of a larger network of computers associated with an entity.

Interface 162 of filter engine 160 represents any suitable computer element that can receive information from network 110, transmit information through network 110, perform suitable processing of the information, communicate to other components (e.g., attribute engine 140) of system 100, or any combination of the preceding. For example, interface 162 may receive electronic data (e.g., an email message) from a server (e.g., a client server) external to the enterprise associated with system 100 via network 110. As another example, interface 162 may receive electronic data from one or more databases 180a-n (e.g., filter database 180c). As still another example, interface 162 may transmit electronic data to one or more computer programs stored in memory 164 of filter engine 160. Interface 162 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 164 of filter engine 160 stores, permanently and/or temporarily, received and transmitted information, as well as system software, control software, other software for filter engine 160, and a variety of other information. Memory 164 may store information for execution by processor 166. In the illustrated embodiment, memory 164 stores filter generator 170 and threat detector 172 of filter engine 160. In some embodiments, filter engine 140 may store one or more databases 180a-n (e.g., a database that stores incoming email messages and/or attributes database 180b).

Memory 164 of filter engine 160 includes any one or a combination of volatile or non-volatile local or remote devices suitable for storing information. For example, memory 164 may include Random Access Memory ("RAM"), Read-only Memory ("ROM"), magnetic storage devices, optical storage devices, or any other suitable information storage device or a combination of these devices. Memory 164 may include any suitable information for use in the operation of filter engine 160. Additionally, memory 164 may be a component external to (or may be partially external to) filter engine 160. Memory 164 may be located at any location suitable for memory 164 to communicate with filter engine 160.

Processor 166 of filter engine 160 controls certain operations of filter engine 160 by processing information received from interface 162 and memory 164 or otherwise accessed by processor 166. Processor 166 communicatively couples to interface 162 and memory 164. Processor 166 includes any hardware and/or software that operates to control and process information. Processor 166 may be a programmable logic device, a microcontroller, a microprocessor, any suitable processing device, or any suitable combination of the preceding. Additionally, processor 166 may be a component external to filter engine 160. Processor 164 may be located in any location suitable for processor 166 to communicate with filter engine 160. Processor 166 controls the operation of filter generator 170 and threat detector 172.

In the illustrated embodiment, filter generator 170 of filter engine 160 creates filters based on data obtained from one or more components of system 100. In some embodiments, filter generator 170 creates filters based on attributes extracted from the electronic data. For example, filter generator 170 may create a filter based on matching attributes in electronic data (e.g., email messages) associated with the same identifier. As another example, filter generator may identify a campaign based on the calculated matching attribute specificity value being below a certain threshold (e.g., an average specificity value) and create a filter based on the identified campaign. As still another example, filter generator 170 may create a filter based on the identified campaign and the rejection probability value. In certain embodiments, the rejection probability may be used to confirm that the identified campaign is actually a threat or unwanted information. In certain embodiments, another factor may be used to confirm the identified campaign is actually a threat or unwanted information, such as a manual acknowledgement by a threat analyst and/or feedback from a recipient of the electronic data.

In certain embodiments, threat detector 172 of filter engine 160 detects threats in electronic data. Threat detector 172 may determine whether the electronic data presents a threat (e.g., a virus) to its intended recipient by applying one or more filters. For example, threat detector 172 may apply one or more filters created by filter generator 170 to determine whether the electronic data presents a threat. As another example, threat detector 172 may apply one or more filters stored in filter database 180c to determine whether the electronic data presents a threat. In certain embodiments, threat detector 172 determines whether to reject or deliver the electronic data to its intended recipient. For example, threat detector 172 may determine, based on the one or more applied filters, that an email message presents a threat and, based on this determination, reject delivery of the email. As another example, threat detector 172 may determine, based on the one or more applied filters, that an email message is free from threat and, based on this determination, deliver the email.

In the illustrated embodiment, system 100 includes databases 180a-n, where n is any suitable integer. Databases 180a-n are any databases that can store data associated with system 100. Databases 180a-n may store certain types of information for the entity associated with system 100. In certain embodiments, databases 180a-n may be a single database. In some embodiments, each database 180a-n may store a particular type of information. For example, database 180n may store electronic data received by system 100.

In some embodiments, database 180a stores identifiers associated with system 100. For example, database 180a may store identifiers extracted from extraction generator 130 of identifier engine 120. The identifiers stored in database 180a may be fluid and change over time. For example, a user may add or delete one or more identifiers to or from identifier database 180a. As another example, system 100 may automatically add or delete one or more identifiers to or from identifier database 180a through machine learning.

In certain embodiments, database 180b stores attributes associated with system 100. For example, database 180b may store attributes extracted from extraction generator 150 of attribute engine 140. The attributes stored in database 180b may be fluid and change over time. For example, a user may add or delete one or more attributes to or from attribute database 180b. As another example, system 100 may automatically add or delete one or more attributes to or from attribute database 180b through machine learning.

Filter database 180c of system 100 may store one or more filters associated with system 100. For example, filter database 180c may store blacklists (e.g., an IP address blacklist or a URL/Phone/action item blacklist). As another example, filter database 180c may store filters created by filter generator 170. The filters stored in database 180c may be fluid and change over time. For example, a user may add or delete one or more filters to or from filter database 180c. As another example, system 100 may automatically add or delete one or more filters to or from filter database 180c through machine learning (e.g., system 100 may automatically store filters created by filter generator 170 in real-time).

Databases 180a-n include any one or a combination of volatile or non-volatile local or remote devices suitable for storing information. For example, databases 180a-n may include Random Access Memory ("RAM"), Read-only Memory ("ROM"), magnetic storage devices, optical storage devices, or any other suitable information storage device or a combination of these devices. While databases 180a-n are shown separate from identifier engine 120, attribute engine 140, and filter engine 160, in the illustrated embodiment of FIG. 1, databases 180a-n may be located in any location suitable for communication with identifier engine 120, attribute engine 140, and filter engine 160. For example, databases 180a-n may be externally located from system 100. As another example, identifier database 180a of databases 180a-n may be located in identifier engine 120, attributes database 180b may be located in attribute engine 140, and database 180c may be located in filter engine 160. Although described as a database, databases 180a-n may be implemented as any suitable type of volatile or non-volatile memory. Databases 180a-n may include one or more interfaces and/or processors.

Figure 2:
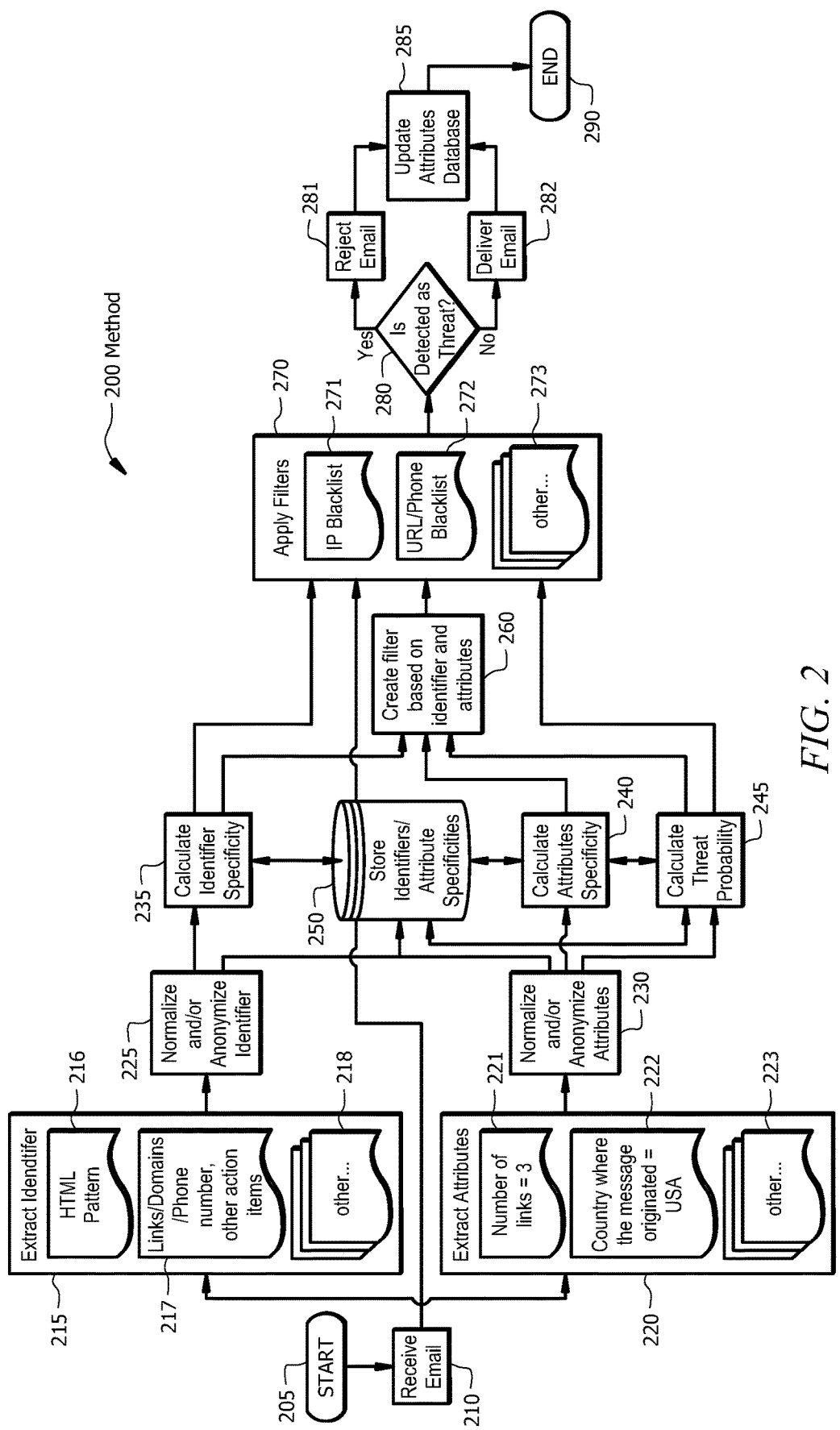
FIG. 2 illustrates an example method for filtering electronic data that may be used by the system of FIG. 1, according to some embodiments.

FIG. 2 illustrates an example method 200 for filtering electronic data that can be used by system 100, according to some embodiments. Method 200 begins at step 205. Method 200 then proceeds to step 210, where system 100 receives electronic data (e.g., an email message). In certain embodiments, the electronic data may be received from a source external to the entity associated with system 100. For example, the electronic data may be received from a customer of the entity associated with system 100.

At step 215, one or more identifiers are extracted from the electronic data. Identifiers may include HTML pattern 216, a link 217, or another identifier 218, such as an IP address. Method 200 may then advance to step 225, where the one or more extracted identifiers are normalized and/or anonymized. For example, normalization generator 132 of identifier engine 120 of system 100 may normalize identifiers that are logically equivalent. As another example, anonymization generator 134 of identifier engine 120 may anonymize the identifier to secure the data. For instance, the identifier may be anonymized through cryptographic hash functions.

At step 220, one or more attributes are extracted from the received electronic data. Attributes may include a number of links in an email message 221 (e.g., 3 links), a country where the message originated 222 (e.g., USA), or another attribute 223, such as a number of emails blocked from the sender's IP address (e.g., 3 blocked emails). In certain embodiments, the extracted attributes are key/value pairs. Method 200 may then advance to step 230, where the one or more extracted attributes are normalized and/or anonymized. For example, normalization generator 152 of attribute engine 140 of system 100 may normalize attributes that are logically equivalent. As another example, anonymization generator 154 of attribute engine 140 may anonymize attributes to secure the data. For example, the attributes may be anonymized through cryptographic hash functions. At step 240, a specificity is calculated for the received electronic data. In certain embodiments, the specificity value is calculated based on the specificity equation provided in the description of FIG. 1 above. In certain embodiments, the specificities calculated for all incoming electronic data (e.g., email messages) are averaged to determine an average specificity value. The average specificity value may be updated automatically. For example, system 100 may recalculate the average specificity value in real-time after calculating the attribute specificity value for each incoming electronic data.

In certain embodiments, identifier database 180a is searched for identifiers that match the one or more extracted identifiers to determine a number of matching identifiers. For example, identifier database 180a may extract a first identifier from an email message and determine that the first identifier matches a certain number (e.g., 1500) of identifiers extracted from other email messages and stored in database 180a. If number of matching identifiers is greater than a first predetermined threshold (e.g., 1,000), then method 200 proceeds to step 235, where a specificity for the matching attributes of the received electronic data is calculated. If the number of matching identifiers is less than or equal to the first predetermined threshold, then the method proceeds to step 290, where method 200 ends. The determination that the first identifier matches a certain number of identifiers extracted from other email messages may have a temporal component. For example, system may determine that the first identifier matches a certain number of identifiers extracted from other email messages within a certain time period (e.g., 5 minutes, 10 minutes, or an hour) and compare that number to the first predetermined threshold.

At step 235, a matching attribute specificity value is calculated for the received electronic data. In certain embodiments, the matching attribute specificity value is calculated based on matching attributes from multiple electronic data (e.g., multiple email messages) that have matching identifiers. For example, the first identifier of the electronic data received at step 210 may be matched to identifiers in 1,500 messages. System 100 may then determine which attributes are included in all 1,500 messages (i.e., the matching attributes) and calculate a specificity value using the matching attributes in the 1,500 messages with matching identifiers. In certain embodiments, the matching attribute specificity value is calculated based on the specificity equation provided in the description of FIG. 1.

In certain embodiments, system 100 determines whether the matching attribute specificity value calculated at step 235 is less than or equal to a second predetermined threshold. In certain embodiments, the second predetermined threshold is the average of the specificity values calculated for each incoming electronic data (e.g., email message) at step 240. If the matching attributes specificity value is less than or equal to the average single electronic data specificity value, method 200 advances to step 260, where a filter may be created based at least in part on the matching attributes. If the matching attributes specificity value is greater than the average single electronic data specificity value, method 200 advances to step 290, where method 200 ends.

At step 245, a rejection probability (e.g., a threat probability) is calculated for the received electronic data. For example, the rejection probability value may be calculated based on the rejection probability equation provided above in the description of FIG. 1. In certain embodiments, the rejection probability represents a probability that system 100 should reject (e.g., block) the electronic data from being delivered to its intended recipient.

At step 250, one or more identifiers, attributes, attribute specificities, and rejection probabilities may be stored in one or more databases 180a-n. For example, the identifiers extracted in step 215 from the received email may be stored in identifier database 180a. As another example, the attributes extracted in step 220 from the received email may be stored in attributes database 180b. In certain embodiments, the identifiers and attributes are stored after they have been normalized and/or anonymized in steps 225 and 230, respectively. In some embodiments, the calculated specificities and/or probabilities may be stored in a database at step 250. For example, the matching attributes specificity values calculated at step 235 may be stored in identifier database 180a. As another example, the attribute specificity values and the average attribute specificity values calculated at step 240 may be stored in attributes database 180a. As still another example, the rejection probabilities calculated at step 245 may be stored in attributes database 180a.

At step 260, one or more filters are created based on the identifiers and/or attributes extracted from the received electronic data. In certain embodiments, a filter is created based at least in part on the calculated matching attribute specificity value and the calculated average specificity value. For example, if the matching attribute specificity value is less than or equal to the average specificity value, a filter may be created that includes the matching attributes. In some embodiments, a filter may be created based at least in part on the calculated rejection probability value. For example, a filter may be created using the matching attributes if the calculated rejection probability value is greater than a certain value (e.g., 50 percent or 90 percent).

At step 270, one or more filters are applied to the received electronic data. The one or more filters may include an IP blacklist 271, a URL and/or phone blacklist 272, or another filter 273, such as the one or more filters created at step 260. The one or more applied filters may be stored in filter database 180c of system 100.

Method 200 then proceeds to step 280. At step 280, system 100 determines whether a threat is detected in the received electronic data. For example, system 100 may detect a threat in the received email if the received email includes one of the filters (e.g., an item listed in IP blacklist 271 and/or the matching attributes of a created filter) applied at step 270. If system 100 detects a threat in the electronic data, method 200 moves to step 281, where system 100 rejects the electronic data (e.g., blocks an email message from being delivered to its recipient). If system 100 determines that the electronic data is free from threat, method 200 advances to step 282, where the system delivers the electronic data to its recipient.

Method 200 then advances to step 285, where attributes database 180b may be updated for each extracted attribute based on the result of step 280. For example, the rejected count for a particular attribute (e.g., Links/4) will be incremented by one (e.g., from 5 to 6) in the event system 100 determines the received electronic data should be rejected (see, e.g., step 281) and the received electronic data contains the particular attribute. Method 200 then proceeds to step 290, where method 200 ends.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for detecting potentially harmful data, including the particular steps of the method of FIG. 2, this disclosure contemplates any suitable method for detecting potentially harmful data including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
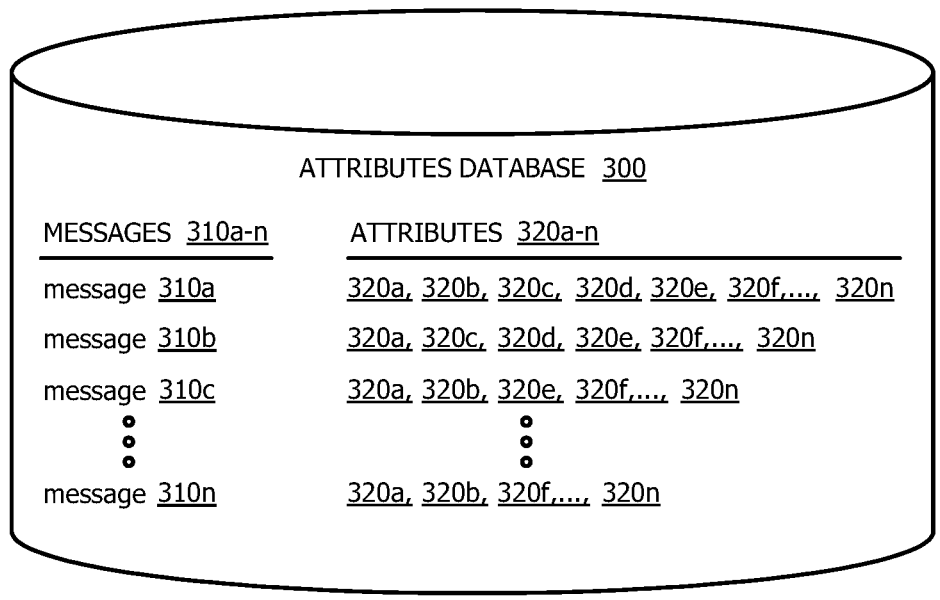
FIG. 3A illustrates an example attributes database that may be used in the embodiment of FIG. 1, according to certain embodiments.

FIG. 3A illustrates an example attributes database 300 that may be used in the embodiment of FIG. 1, according to certain embodiments. Attributes database 300 may include electronic data (e.g., messages 310a-n, where n represents any suitable integer). Message 310a may include attributes extracted from message 310a, such as attributes 320a, 320b, 320c, 320d, 320e, 320f, and 320n. Message 310b may include attributes extracted from message 310b, such as attributes 320a, 320c, 320d, 320e, 320f, and 320n. Message 310c may include attributes extracted from message 310c, such as attributes 320a, 320b, 320e, 320f, and 320n. Message 310n may include attributes extracted from message 310n, such as attributes 320a, 320b, 320f, and 320n.

An attribute specificity value may be calculated for each message 310a, message 310b, message 310c, and message 310n. In certain embodiments, the calculated attribute specificity values for message 310a, message 310b, message 310c, and message 310n may be averaged to determine an average specificity value. In some embodiments, the average specificity value represents the second predetermined threshold described in FIGS. 1 and 2 above.

Figure 3B:
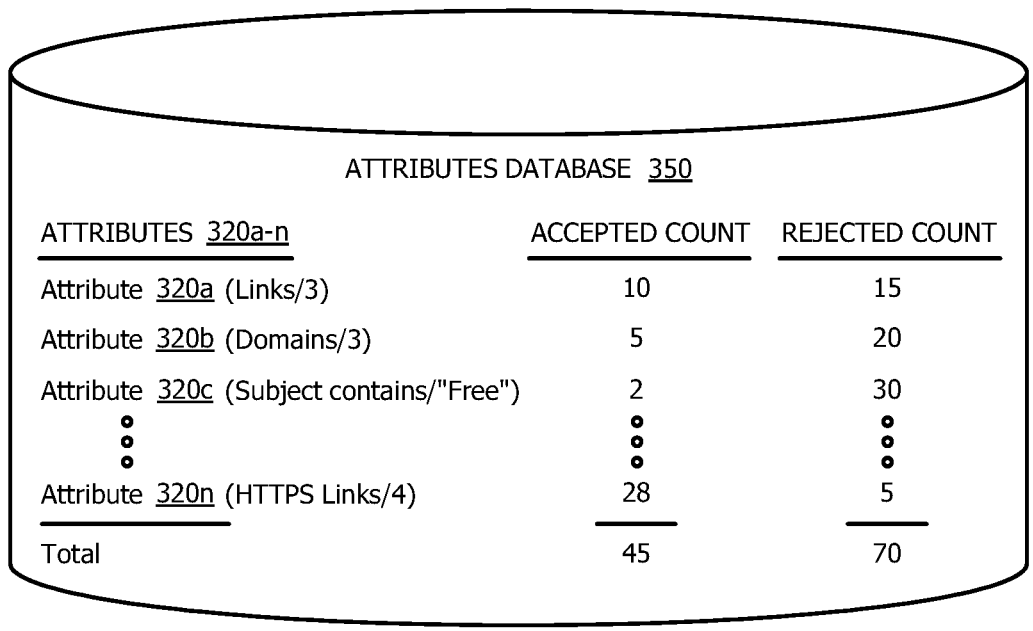
FIG. 3B illustrates an example attributes database that may be used in the embodiment of FIG. 1, according to certain embodiments.

FIG. 3B illustrates an example attributes database 350 that may be used in the embodiment of FIG. 1, according to certain embodiments. Attributes 320a-n, where n represents any integer, represent the attributes extracted from messages 310a-n of FIG. 3A. The accepted count represents the number of messages 310a-n that system 100 accepted (see step 282 of FIG. 2). The rejected count represents the number of messages 310a-n that system 100 rejected (see step 281 of FIG. 2).

Attribute 320a is the key/value pair Links/3, which represents 3 links extracted from the electronic data. The accepted count for Links/3 from messages 310a-n of FIG. 3A is 10 and the rejected count is 15. Attribute 320b is the key/value pair Domains/3, which represents 3 domains extracted from the electronic data. The accepted count for Domains/3 from messages 310a-n of FIG. 3A is 5 and the rejected count is 20. Attribute 320c is the key/value pair Subject contains/"Free", which represents the term "Free" extracted from the subject of the electronic data. The accepted count for Subject contains/ "Free" from messages 310a-n of FIG. 3A is 2 and the rejected count is 30. Attribute 320n is the key/value pair HTTP Links/4, which represents 4 HTTP links extracted from the subject of the electronic data. The accepted count for HTTP Links/4 from messages 310a-n of FIG. 3A is 28 and the rejected count is 5. The total accepted count for all messages is 45 and the total rejected count for all messages is 70. These values are used for the specificity and probability equations described above in FIG. 1.

Figure 4:
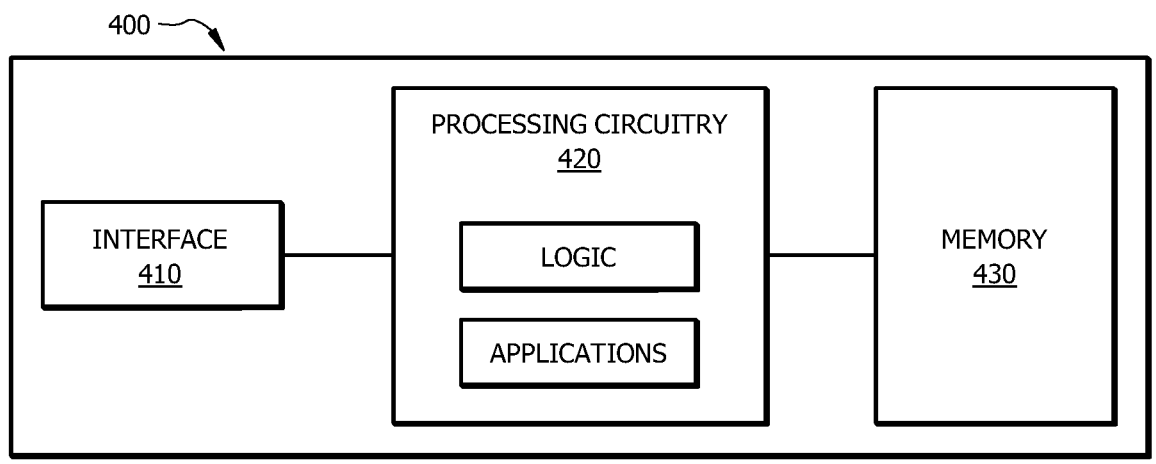
FIG. 4 illustrates an example of elements that may be included in the system of FIG. 1, according to certain embodiments.

FIG. 4 illustrates an example of elements 400 that may be included in system 100 of FIG. 1, according to certain embodiments. For example, any of network 110, identifier engine 120, attribute engine 140, filter engine 160, and/or databases 180a-n may include one or more interface(s) 410, processing circuitry 420, memory(ies) 430, and/or other suitable element(s). Interface 410 receives input, sends output, processes the input and/or output, and/or performs other suitable operation. Interface 410 may comprise hardware and/or software.

Processing circuitry 420 performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 may comprise one or more non-transitory, tangible, computer-readable, and/or computer-executable storage media. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicant notes that it does not intend any of the appended claims to invoke 35 U.S.C. § 112(f) as it exists on the date of filing hereof unless the words "means for" or "step for" are explicitly used in the particular claim.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A filtering system, comprising:
an interface operable to receive electronic data;
one or more extraction generators operable to:
    extract a first identifier from the electronic data; and
    extract first attributes from the electronic data;
one or more specificity generators operable to:
    search a database for identifiers that match the first identifier to determine a number of matching identifiers;
    determine that the number of matching identifiers exceeds a first threshold;
    search the database for attributes associated with each of the matching identifiers to determine a subset of matching attributes, wherein the first attributes and the attributes associated with each of the matching identifiers each comprise the subset of matching attributes; and
    calculate, in response to determining that the number of matching identifiers exceeds the first threshold, a specificity for the subset of matching attributes; and
a filter generator operable to:
    determine that the specificity of the subset of matching attributes is less than or equal to a second threshold; and
    create a filter based at least in part on the determination that the specificity of the subset of matching attributes is less than or equal to the second threshold.

2. The system of claim 1, wherein:
the electronic data is an email message;
the first identifier is associated with one of the following:
    an HTML pattern;
    a link;
    a domain; and
    a phone number; and
the first attributes include one of the following:
    a number of links in the email message;
    a country where the email message originated; and
    a number of attachments attached to the email message.

3. The system of claim 1, further comprising:
a threat detector operable to:
    apply the filter to the electronic data;
    detect a threat in the electronic data based at least in part on the applied filter;
    reject delivery of the electronic data to the specified destination of the electronic data based at least in part on the applied filter; and
    automatically update the database to include the filter, wherein the filter is associated with the first identifier and the subset of matching attributes.

4. The system of claim 1, further comprising:
one or more normalization generators operable to:
    normalize the first identifier; and
    normalize each of the first attributes; and
one or more anonymization generators operable to:
    anonymize the first identifier; and
    anonymize each of the first attributes;
wherein the one or more specificity generators are further operable to:
    calculate a specificity for the first attributes; and
    calculate a specificity for the first identifier.

5. The system of claim 1, further comprising a probability generator operable to calculate a threat probability for the first attributes, wherein creating the filter is further based on the threat probability.

6. The system of claim 1, wherein calculating the specificity for the subset of matching attributes is based at least in part on the following:
    a number of total electronic data associated with an accepted count of each matching attribute; and
    a number of the total electronic data associated with a rejected count of each matching attribute.

7. The system of claim 1, wherein:
the interface is further operable to receive a plurality of electronic data;
the first threshold is a predetermined number of matching identifiers received within a predetermined time period; and
the second threshold is an average attribute specificity calculated by averaging the attribute specificities associated with each of the plurality of electronic data, wherein each attribute specificity is calculated using all of the attributes associated with the corresponding electronic data.

8. A method, comprising:
receiving electronic data;
extracting a first identifier from the electronic data;
extracting first attributes from the electronic data;
searching a database for identifiers that match the first identifier to determine a number of matching identifiers;
determining that the number of matching identifiers exceeds a first threshold;
searching the database for attributes associated with each of the matching identifiers to determine a subset of matching attributes, wherein the first attributes and the attributes associated with each of the matching identifiers each comprise the subset of matching attributes;
calculating, in response to determining that the number of matching identifiers exceeds the first threshold, a specificity for the subset of matching attributes;
determining that the specificity of the subset of matching attributes is less than or equal to a second threshold; and
creating a filter based at least in part on the determination that the specificity of the subset of matching attributes is less than or equal to the second threshold.

9. The method of claim 8, wherein:
the electronic data is an email message;
the first identifier is associated with one of the following:
    an HTML pattern;
    a link;
    a domain; and
    a phone number; and the first attributes include one of the following:
a number of links in the email message;
a country where the email message originated; and
a number of attachments attached to the email message.

10. The method of claim 8, further comprising:
applying the filter to the electronic data;
detecting a threat in the electronic data based at least in part on the applied filter;
rejecting delivery of the electronic data to the specified destination of the electronic data based at least in part on the applied filter; and
automatically updating the database to include the filter, wherein the filter is associated with the first identifier and the subset of matching attributes.

11. The method of claim 8, further comprising:
normalizing the first identifier;
anonymizing the first identifier;
calculating a specificity for the first identifier;
normalizing each of the first attributes;
anonymizing each of the first attributes; and
calculating a specificity for the first attributes.

12. The method of claim 8, further comprising calculating a threat probability for the first attributes, wherein creating the filter is further based on the threat probability.

13. The method of claim 8, wherein calculating the specificity for the subset of matching attributes is based at least in part on the following:
a number of total electronic data associated with an accepted count of each matching attribute; and
a number of the total electronic data associated with a rejected count of each matching attribute.

14. The method of claim 8, further comprising receiving a plurality of electronic data, wherein:
the first threshold is a predetermined number of matching identifiers received within a predetermined time period; and
the second threshold is an average attribute specificity calculated by averaging the attribute specificities associated with each of the plurality of electronic data, wherein each attribute specificity is calculated using all of the attributes associated with the corresponding electronic data.

15. A non-transitory computer readable medium comprising instructions for causing processing circuitry to:
receive electronic data;
extract a first identifier from the electronic data; and
extract first attributes from the electronic data;
search a database for identifiers that match the first identifier to determine a number of matching identifiers;
determine that the number of matching identifiers exceeds a first threshold;
search the database for attributes associated with each of the matching identifiers to determine a subset of matching attributes, wherein the first attributes and the attributes associated with each of the matching identifiers each comprise the subset of matching attributes;
calculate, in response to determining that the number of matching identifiers exceeds the first threshold, a specificity for the subset of matching attributes;
determine that the specificity of the subset of matching attributes is less than or equal to a second threshold; and
create a filter based at least in part on the determination that the specificity of the subset of matching attributes is less than or equal to the second threshold.

16. The computer readable medium of claim 15, wherein the instructions further cause the processing circuitry to:
dynamically update a list of the identifiers in the database based on one or more pre-determined criteria; and
dynamically update a list of the attributes in the database based on one or more pre-determined criteria.

17. The computer readable medium of claim 15, wherein the instructions further cause the processing circuitry to:
apply the filter to the electronic data;
detect a threat in the electronic data based at least in part on the applied filter;
reject delivery of the electronic data to the specified destination of the electronic data based at least in part on the applied filter; and
automatically update the database to include the filter, wherein the filter is associated with the first identifier and the subset of matching attributes.

18. The computer readable medium of claim 15, wherein the instructions further cause the processing circuitry to:
normalize the first identifier;
anonymize the first identifier;
calculate a specificity for the first identifier;
normalize each of the first attributes;
anonymize each of the first attributes; and
calculate a specificity for the first attributes.

19. The computer readable medium of claim 15, wherein the instructions further cause the processing circuitry to calculate a threat probability for the first attributes, wherein creating the filter is further based on the threat probability.

20. The computer readable medium of claim 15, wherein calculating the specificity for the subset of matching attributes is based at least in part on the following:
a number of total electronic data associated with an accepted count of each matching attribute; and
a number of the total electronic data associated with a rejected count of each matching attribute.

* * * * *